United States Patent [19]

Sheldon et al.

[11] 4,434,572
[45] Mar. 6, 1984

[54] RETRIEVAL OF LOBSTERS AND OTHER OBJECTS

[75] Inventors: William W. Sheldon, R.F.D. #2, Box 292, Ellsworth, Me. 04605; Theodore G. Axford, Milbridge, Me.

[73] Assignee: William W. Sheldon, Ellsworth, Me.

[21] Appl. No.: 246,599

[22] Filed: Mar. 23, 1981

[51] Int. Cl.³ ............................................. A01K 80/00
[52] U.S. Cl. ........................................ 43/6.5; 43/4.5; 43/26.1; 56/9; 114/255
[58] Field of Search ................. 43/6.5, 4, 4.5, 26.1; 417/108; 37/119, 55; 114/255; 56/9

[56] References Cited

U.S. PATENT DOCUMENTS

| | | | |
|---|---|---|---|
| 1,138,541 | 5/1915 | Conekin | 114/255 X |
| 2,672,700 | 3/1954 | Hanks | 43/6.5 X |
| 3,546,858 | 12/1970 | Chaplin | 56/9 |
| 3,683,862 | 8/1972 | Reynolds | 43/6.5 X |
| 3,783,535 | 1/1974 | Hanks | 43/6.5 X |
| 3,808,779 | 5/1974 | Randall | 56/9 |
| 4,261,160 | 4/1981 | Niewiera | 56/9 X |

FOREIGN PATENT DOCUMENTS

| | | | |
|---|---|---|---|
| 842282 | 5/1952 | Fed. Rep. of Germany | 43/6.5 |
| 1398569 | 12/1965 | France | 43/6.5 |
| 490450 | 2/1976 | U.S.S.R. | 43/6.5 |

Primary Examiner—Nicholas P. Godici
Assistant Examiner—Charles L. Willis
Attorney, Agent, or Firm—Daniel H. Kane, Jr.

[57] ABSTRACT

Method and apparatus for retrieving lobsters or similar objects from the floor of a lobster pound or other shallow water body are described. An upward flow of water is established in a flexible conduit or passageway of size sufficient to accommodate the objects to be lifted. This is accomplished by a low pressure air lift particularly suited for non-traumatic handling of lobsters. Objects to be lifted are drawn into the upward flow as the flexible conduit is moved over the bottom. As objects rise to the surface they are guided or diverted by a transfer guide chamber or coupling onto a conveyor which carries the objects onto a deck or support platform floating above the water surface. The transfer chamber and conveyor shed water away from the lobsters or other objects. The transfer guide chamber, conveyor and a pivotable boom for supporting the flexible conduit in an "S" configuration are attached to a deck or support platform floating above the surface. The entire rig moves throughout the area of the lobster pound or other water body for recovering lobsters at any location.

15 Claims, 8 Drawing Figures

RETRIEVAL OF LOBSTERS AND OTHER OBJECTS

BACKGROUND OF THE INVENTION

This invention relates to a new method and apparatus for retrieving lobsters and similar objects from the bottom or floor of a lobster pound or other shallow water body. The invention provides for lifting the objects to the surface in a flow of water, and for handling the objects above the surface to place them on a deck or support platform floating above the water surface. This is accomplished with minimum impact, disruption, or injury to the lobsters or other objects.

Lobster pounds were first developed in Maine and adjacent states and provinces at the end of the 1800's for live storing the excess lobster catch of the summer and fall for later sale in the winter. The use of such lobster pounds more evenly distributes the supply of lobster over the year and affords speculative benefit to the pound owner who may hold the lobsters until the market is more favorable. A lobster pound is a portion at the head of a cove or harbor sometimes several acres in extent. The pound portion is diked off by a half tide impoundment or dam which holds back a portion of each outgoing tide for the sustenance of the lobsters held in the pound. When the high tide returns the water overtops the impoundment refilling, circulating, and aerating the water. Escape by lobsters, dwelling on the floor or bottom of the pound, is prevented by the dike or impoundment.

Lobsters from the summer and fall catch are deposited in the lobster pounds and as many as 100,000 lobsters may be live stored in this manner for many months in a single pound. The lobsters are fed until they become more or less dormant in the dold weather. Then, during the late winter months when the market is deemed favorable, the pound owner begins retrieving the lobsters for sale and shipment. The traditional method for retrieving the lobsters, and the only method for well over 50 years until the advent of the present invention, has been to drag for the lobsters, pulling a weighted drag, for example of chain links, over the bottom. Depending upon the bottom conditions, as many as 10% of the lobsters may be mutilated or suffer other damage during this recovery by conventional methods.

When the lobsters in the pound have been substantially depleted near the end of winter, dragging for the remaining lobsters sparsely distributed over the bottom becomes unfeasible. Therefore the pound must be drained and the remainder retrieved by hand according to the conventional methods. Such draining furthermore subjects the lobster to high risk due to cold weather etc.

Furthermore, a recent innovation in lobster pounds, is the installation of aeration systems on the bottom of the pound, to aerate and oxygenate the impounded waters during low tide. Such aeration increases the lobster holding capacity of the pound, otherwise limited by the anoxic stress suffered by the lobsters during the stagnation of low tide. The conventional methods of lobster retrieval by dragging are incompatible with such bottom aeration systems and may cause damage as the weighted drag passes over the bottom. In addition many types of bottom terrain and obstructions are incompatible with dragging, and dragging can not be used.

OBJECTS OF THE INVENTION

It is therefore an object of the present invention to provide a new method and apparatus for retrieving lobsters and similar forms from the bottom or floor of lobster pounds and other water bodies by lifting the objects in a flow of water and gently handling the objects above the surface in an effective manner. A feature and advantage of the method and apparatus is that damage or injury to the lobster during retrieval is effectively eliminated, and risks from exposure to cold weather are also minimized.

Another object of the invention is to provide for recovery of objects from the bottom of a water body by a method which is compatible with bottom aeration systems, as for example, are now being installed in lobster pounds, and which may be used when difficult bottom terrain and obstructions make dragging unfeasible. The method is also effective for recovering a low density and disbursed distribution of lobsters when dragging would also be ineffective.

A further object is to provide a method for retrieving lobsters, bottom dwellers, and other objects from the bottom of a water body which is faster than dragging and requires a smaller crew and safer equipment.

SUMMARY OF THE INVENTION

In order to accomplish these results the present invention contemplates the method of establishing a flow of water upward from the bottom to the surface in a flexible conduit or passageway of size sufficient to accommodate objects to be lifted. The upward flowing water rises or gushes to the surface and objects to be lifted are drawn into the upward flow as the flexible conduit is moved over the bottom. As the objects rise to the surface they are guided or diverted onto a conveyor which carries the objects onto a deck or support platform floating above the water surface. The objects are deposited or dropped onto the deck or platform in an energy dissipating shock absorbing manner for further sorting and processing.

The upward flow of water in the flexible passageway is established by an air lift. Air at low pressure is released into the conduit or passageway below the water surface at the base of a substantially straight vertical section or lift column leading to the surface. Rising air displaces water in the lift column and water under pressure rushes upward producing the upward flow. Preferably an annular air jet manifold is used for injecting jets of air from all sides into the lift column portion of the passageway.

In the preferred embodiment, the flexible conduit or passageway is supported so that it includes an S-curve configuration having upward convex and downward convex portions followed by the vertical lift column. A pivotable boom with resilient stay or guy wire supports the flexible conduit at the upward convex portion. The air lift for establishing an upward flow of water is injected at the lift column following the downward convex portion. The pivotable boom with elastic stay permits movement of the flexible passageway vertically and laterally to different areas of the bottom. Furthermore, a handle at the inlet end is provided so that a diver may guide and aim the passageway more precisely for lifting objects.

A transfer guide chamber or coupling couples the top of the flexible passageway and rising water flow with the conveyor. It includes a cover surface which diverts and directs objects rising to the surface onto the conveyor. The cover surface and chamber enclosure are formed with openings for shedding and diverting excess water in the opposite direction or away from the lobsters or other objects as they directed onto the conveyor. The conveyor also sheds water and further "dewaters" the lobsters.

The transfer guide chamber, conveyor and pivotable boom are mounted on a bracket or frame attached to a deck or support platform floating above the surface. The flexible conduit or passageway is suspended at one end from the frame and the rigidly mounted elements, and moves flexibly at the other end relative to these elements. The entire rig is typically mounted on a barge or floating deck or platform for movement throughout the area of the lobster pound or other water body. For this purpose, the floating platform is self-propelled, for example, by an outboard motor.

For application in lifting and retrieving objects other than lobsters, the inlet end of the flexible passageway may be fitted with a grill for passing objects of only a certain size range or configuration.; For example, a grill of narrow parallel pipe spaced 1½" apart may be used to stop and exclude lobsters while passing lettuce leaf type vegetation for cleaning the bottom of a lobster pound.

Other objects features and advantages of the invention will become apparent in the following specification and accompanying drawings.

DESCRIPTION OF THE PREFERRED EMBODIMENTS

Figure 1:
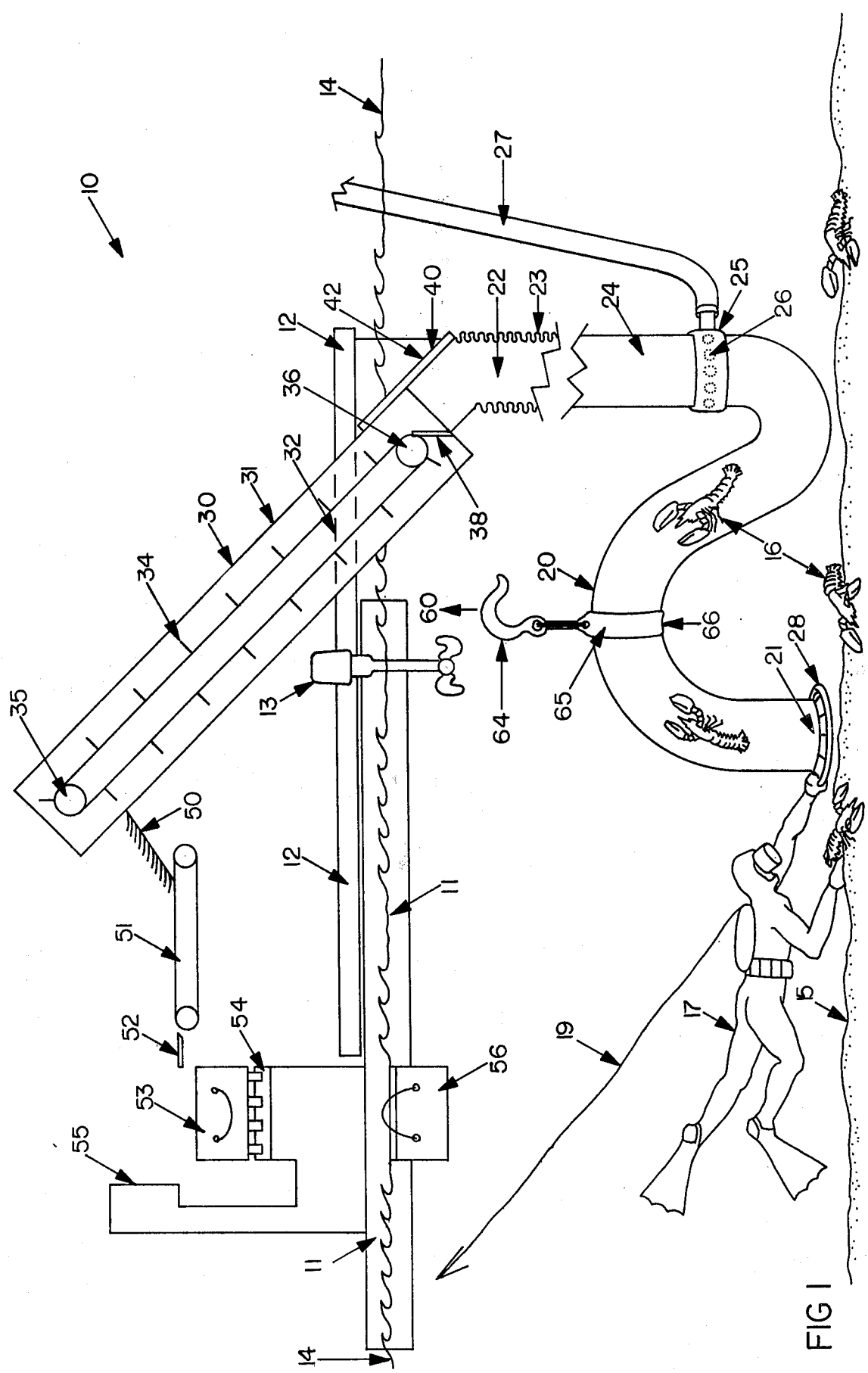
FIG. 1 is a diagrammatic view from the side of a Lobster Lift Machine and Method for Retrieving Lobsters according to the present invention.
Figure 2:
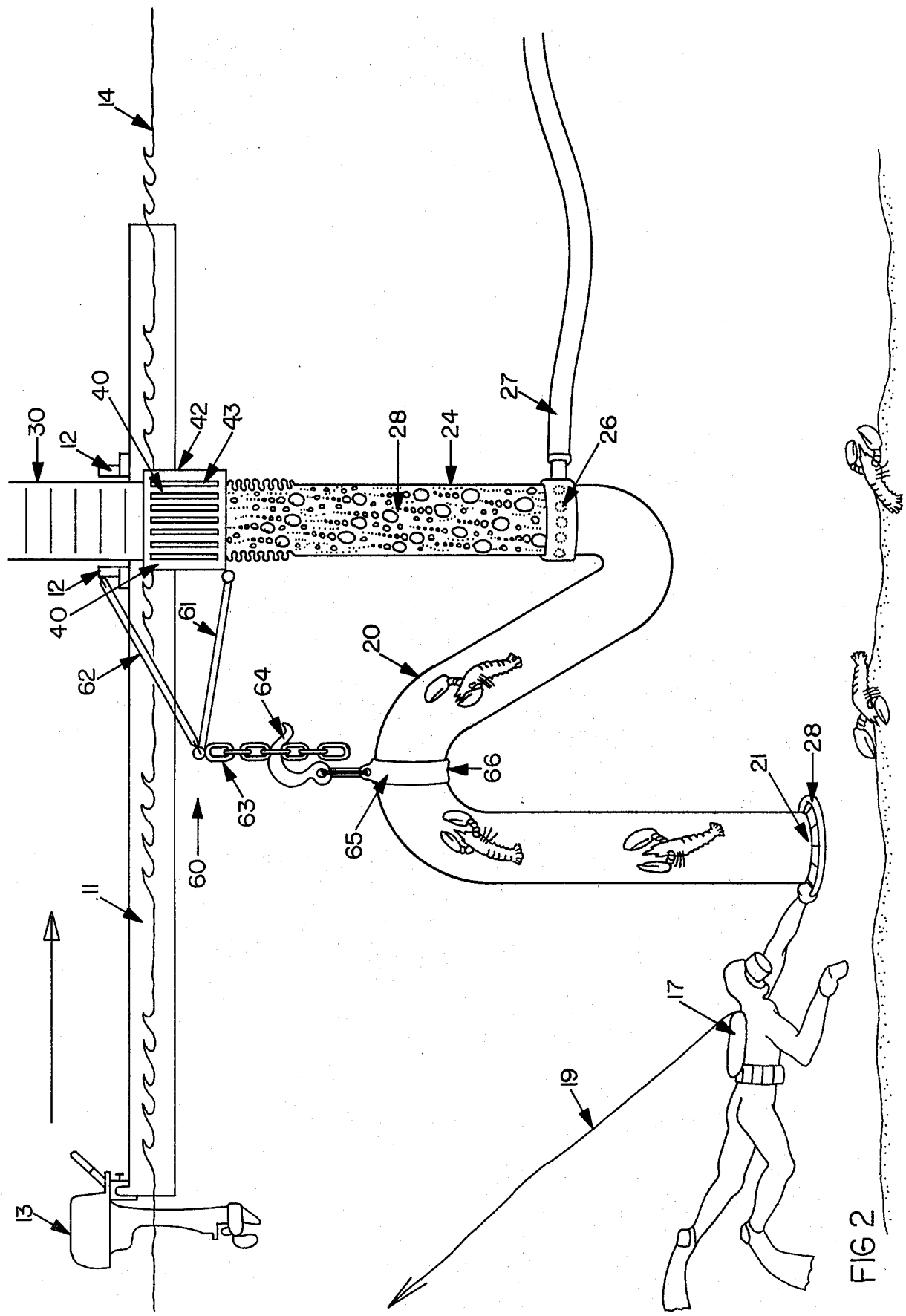
FIG. 2 is a diagrammatic view from the end or front of the machine also illustrating the Method for Retrieving Lobsters according to the present invention.

Referring to the diagrammatic views of FIGS. 1 and 2, there is generally shown a Lobster Lift Machine 10 mounted on a floating platform 11 by means of mounting brackets 12. The floating platform 11 is of sufficient size and flotation capacity to accommodate the Lobster Lift Machine 10 supporting machinery, personnel and crates for sorting and packing the lobsters recovered from the floor of the lobster pound. Such a floating platform is for example 16 feet wide by 24 feet long and according to the present invention is self propelled by outboard motor 13 for independent movement throughout the area of the lobster pound.

The Lobster Lift Machine 10 generally comprises a flexible conduit or passageway 20 supported beneath the water surface a conveyor 30 which extends above the water surface for delivering lobsters to a sorting area on the floating platform, and a coupling enclosure for hopper 40 for coupling the upper output end of the flexible passageway 20 with the lower input end of the conveyor 30. The Lobster Lift Machine also includes a resilient impact surface 50 and associated accessories for receiving the lobsters for sorting and packing.

Referring to FIG. 1, the flexible conduit or passageway has a diameter for example 12 to 14 inches, large enough to accommodate lobsters in the flow of water established upwards through the passageway. The wall of the flexible conduit may be formed with a pleated or accordian configuration to permit bending and flexible movement of the inlet end 21 over the bottom or floor 15 of the lobster pound. Plastic, coated fabric or other flexible marine material may be used for the conduit. The flexible passageway or conduit 20 assumes a generally "S" shaped configuration as shown in FIG. 1 and is supported or suspended in this configuration generally by a pivotally and resiliently mounted boom as shown in FIG. 2 but omitted in FIG. 1 for simplicity and clarity of the illustration. The upper outlet end of the flexible conduit or passageway 20 is joined to the coupling enclosure, transfer enclosure or hopper 40 as it is variously known by means of a heavily pleated accordian section 23 forming a flexible joint for purposes hereafter described.

The "S" shaped curvature portion of the flexible passageway 20 generally includes a convex upward portion 66 and convex downward portion leading to a substantially straight vertical section or portion 24 also referred to herein as the lift column. The lift column is made of a rigid material so that it maintains a reliably straight vertical attitude except when the lift column strikes an obstruction in which case it may move laterally at the flexible joint 23 thereby diverting stress and preventing breakage. Following the convex downward portion of the flexible passageway 20 and at the base of lift column 24 is mounted and secured an air injection manifold 25, in this case of annular configuration. The air injection manifold 25 around the circumference of the base of the lift column 24 delivers air into the lift column from all directions circumferentially around the column through a plurality of holes 26 extending from the manifold 25 into the lift column 24. Low pressure air is supplied through air hose 27 by a high volume low pressure rotary blower rather than a compressor as hereafter described. It is essential that low pressure air be used in order not to endanger or injure the lobsters. Air hose 27 is typically for example 3 to 4 inches in diameter to accommodate and deliver for example 350 cubic feet per minute.

The air lift formed by lift column 24 with air supplied through hose 27 operates by displacement of air in the lift column 24. For this reason it is important that lift column 24 be maintained in a substantially vertical position so that the rise of bubbles 28 is distributed throughout the cross section of the lift column rather than diverted to one side. As a result of displacement of the water in lift column 24 by the large volume of low pressure air injected through the holes of the manifold 25 water under pressure rushes upward through the inlet 21 and flexible passageway 20 to the top of the lift column and outlet 22 of the flexible passageway 20. It is estimated that with the lift column 12 inches in diameter, an air injection manifold approximately 4 to 6 feet below the water surface 14, and delivery of 350 cubic feet per minute of air into the lift column, a flow rate of approximately 2000 gallons per minute may be established in the flexible conduit or passageway 20. Factors which determine the head or lift established in lift column 24 include the volume flow rate of delivered air, depth of air release and losses from friction in the walls of the lift column or from back pressure at the head of the column. For the typical lobster pound having depths of water in the range of 6 to 25 feet a lift column 3 to 5 feet in height has been found sufficient to establish the flow necessary for moving lobsters from the bottom to the surface.

Operation of the flexible conduit or passageway 20 is described in further detail with respect to FIG. 2 however with reference to FIG. 1 it is noted that the inlet end 21 is formed with a circular handle 28 extending around the outside of the inlet end 21 so that it may be held and guided by a diver 17 with the inlet end 21 spaced above the floor or bottom 15 of the lobster pound at a height for example of 6 to 8 inches above the bottom. In the example of FIG. 1 the diver 17 is dislodging with one hand a dormant winter lobster 16 from the mud or silt at the bottom 15 of the lobster pound for entrainment in the flow of water upwards through the flexible passageway 20. Thus, the lobster is sucked and drawn into the open inlet end 21 of the passageway. When high densities of lobsters are encountered on the floor of the lobster pound with lobsters grouped together or on top of each other, the lobsters are readily drawn into the upward flow without handling.

The top section of passageway 20 including the substantially straight vertical lift column portion 24 is coupled through a flexible length 23 to a coupling enclosure or chamber 40 which couples the top of the passageway to the conveyor 30. This enclosure portion 40 includes an angled upper surface or cover 42 which directs lobsters lifted in the upward flow of water onto the moving elements of conveyor 30 to be lifted onto the floating platform. The enclosure or partial enclosure portion 40 includes sidewalls and generally forms a hopper for feeding, directing and guiding the lobsters onto the conveyor. Another function of the enclosure 40 is to begin the process of "dewatering" the lobsters from the upward flow of water which brings them to the surface. To this end the angled cover surface 42 includes slotted portions 43 which may comprise as much as 50% of the area of the surface. Openings may also be provided at the sides of the enclosure so that water from the upward flow is diverted away from the conveyor and so that the lobster is at least partially separated from the water flow which lifts it to the surface.

In the example of FIGS. 1 and 2 the conveyor 30 extends below the water surface and reaches into the top portion of the coupling enclosure 40. Thus the lift column 24 and rush of water rising upwards within the column delivers the lobsters to the conveyor just below the surface 14 of the water.

The conveyor 30 is formed by a frame 31 which supports the moving belt 32. This moving belt is a mesh type belt with about 50% open portions for further shedding and dewatering the lobsters as they pass upwards on the conveyor surface. The mesh belt is supported by a smooth track below so that the belt forms a weight bearing surface for the lobsters. The endless conveyor belt portion 32 may be formed of plastic link construction, with for example 3 inch high flights or tab sections 34 which support the lobsters as they move upward on the conveyor. The flights 34 are spaced for example at eight inch intervals along the belt and the belt moves at approximately 60 feet per minute velocity by means of an hydraulic drive 35. A complimentary roller 36 at the other end provides the complete circuit for the endless belt. A flexible deflector flap 38 connected to a bottom wall of the coupling enclosure or hopper 40 rests against the conveyor belt and prevents lobsters delivered by the water column from falling or sliding beneath the conveyor. Thus all the lobsters rising in the flow of water are eventually deflected onto the conveyor from the lift column and are "dewatered" as they pass up the conveyor to the resilient impact surface 50.

The resilient impact surface 50 is made from a shaggy pile material such as astro turf which absorbs the impact of lobsters falling approximately 12 inches from the conveyor. The lobsters are thus delivered without injury to an hydraulic powered horizontal conveyor 51 at the packing station. The shaggy surface material on the delivery slide 50 is also selected for high wear characteristics to withstand the repeated impacts of the spiny and abrasive exo-skeleton of the lobster.

At the packing station the lobsters and other material brought up from the floor of the lobster pound pass over the horizontal conveyor 51 and slotted trash or waste materials separater 52 where mussels, seaweed, stones etc. are removed along with any injured or dead lobsters. The lobsters are picked up by the packer or packers and placed in crate 53 at the same time that the unwanted accompanying rocks, seaweed, shells, etc. are separated and discarded. Horizontal conveyor 51 with a smooth surface facilitates separating undesired materials from the lobsters and provides some additional time for such separation steps.

Empty crates are fed to the packing station and delivered from the packing station on the roller type conveyor 54. A particular empty crate 53 is rolled into position at the packing station after the previous crate has been filled and rolled onto the weighing station and scale 55 as hereafter described. After weighing the crate is then rolled off the scale, the cover is closed and secured, and a line is strung through the rope handles of the crate. The crate is then slid or rolled overboard as illustrated for example by crate 56 and the string of crates is towed along behind the floating platform 11.

The floating platform 11 may be provided with a shelter or shed roof for protection of personnel and machinery from the weather if desired. The wooden crates carried on the float for packing lobsters are standardized wooden crates currently used in the industry approximately 30 inches long by 18 inches wide by 12 inches high inside dimensions. This provides ample room for approximately 100 pounds of lobsters. The crates are wooden with rope handles and float when filled with lobsters. The floating crates are therefore strung together with the rope running through the handles and may be towed behind the float.

The outboard motor 13 is mounted on a bracket on the rear corner of the float and provides propulsion steadily to maneuver the floating platform in any direction around the lobster pound. This results in the diver continuously travelling over the bottom of the lobster pound retrieving the lobsters as he passes over them and entraining them in the upward flow of water in the flexible passageway 20. When all the crates are full the float is then driven back to the dock with the filled crates of lobsters towed along behind ready to be hoisted for shipment.

As shown in FIGS. 1 and 2 and as best seen in FIG. 1 the frame 31 of the conveyor 30 is rigidly secured to the mounting brackets 12 which are in turn bolted to the floating platform 11. The coupling enclosure 40 is in turn rigidly connected to the conveyor and mounting bracket. The flexible conduit 20 is secured to the coupling enclosure hopper 40 by flexible joint 23 in order to absorb impacts by the rigid vertical lift column portion 24. Thus, the inlet end 21 of conduit 20 is free to move, while the outlet end 22 via flexible joint 23 is positioned at the enclosure coupling 40 and conveyor 30 in turn secured to the mounting bracket 12.

Referring to FIG. 2 an important element in the operation of the Lobster Lift Machine is the boom arrangement 60 which includes a rigid arm 61 pivotally mounted to the coupling enclosure 40. The rigid arm 61 is mounted for pivotal movement in the lateral direction or horizontal plane. It is also suspended at its end by means of an elastic or rubber stay or guy wire 62 secured to the mounting bracket 12. The rigid arm of the boom is therefore also permitted some play and movement in the vertical direction with expansion and contraction of the resilient stay or support 62. Suspended from the end of the rigid arm 61 is a chain 63 of links large enough to accommodate a hook 64 secured by means of a strap 65 to the flexible conduit passageway 20. It is thus seen that the flexible passageway or conduit 20 is pivotally and resiliently mounted and supported at the convex upward portion 66 of the "S" curvature. The "S" curve is itself formed by the manner in which the boom 60 supports the conduit.

In a typical example the chain 63 and hook portion 64 have a length of approximately 3 to 4 feet and the hook may be adjusted over this length by placement in different links of the chain. Furthermore the strap 65 on the conduit 20 may be adjustable in the length connected to the hook 64 over an additional distance of 3 to 4 feet. The flexible conduit is therefore adjustable for a considerable variation in depth. The boom assembly 60 is free to pivot laterally and back and forth over a wide angle up to 180 degrees. The inlet bore 21 of the conduit moreover may be moved for example up to 6 to 8 inches in a vertical direction toward and away from the bottom of the lobster pound by reason of the elastic or rubber stay 62 which permits resilient play in the vertical direction.

A feature and advantage of the Lobster Lift Machine as illustrated in FIGS. 1 and 2 according to the invention is that every place where lobsters go or pass is designed particularly to accommodate lobsters without injury. Generally increasing diameters are used so that the lobster will not be forced against an obstruction or other structure causing injury. Furthermore by the use of low pressure air in the air lift column 24 disruption of the lobster is also minimized. Typically, the air through supply hose 27 is for example at 3 pounds per square inch pressure delivered 3 to 6 feet below the surface 14 of the water. As a result the air pressure at manifold 26 of air entering the lift column 24 is approximately one pound per square inch or less. As a rule of thumb air pressure of a half a pound per square inch is required per foot of depth in the water. Thus it requires a half a pound per square inch pressure to drive the air each foot below the surface. A release depth of 4 feet for the water results in the pressure drop of 2 p.s.i. While the air pressure is limited to a low level, large volumes of air are utilized for the air lift. Thus for example 350 cubic feet per minute of the low impedance flow of air may be used to displace the water in the water column inducing water under pressure to flow upward through the inlet board 21 and the passageway 20.

As a result of the use of low pressure air there is no blast of air and no violent impact upon the lobsters. At any time approximately one third or one half of the volume in the chimney or lift column 24 may be air. In order to generate the low pressure air no propeller or compressor pump should be used but rather a simple rotary lobe blower. The suction established at the inlet end or bore 21 of the conduit 20 by an air lift as specified above is approximately 18 inches of water negative pressure or three quarters of a pound per square inch negative pressure.

Thus a high volume low pressure rotary lobe or fan or turbine blower is used rather than a piston compressor for generating the air flow. With parameters of the types setforth above a 350 cubic foot per minute flow of air through the air lift can generate 2000 to 3000 gallons per minute flow rate of water in the water flow through the conduit 20.

The negative pressure at the inlet bore 21 of the suction hose 20 tends to suck the conduit against the ground or bottom of the lobster pound. The boom 60 is therefore essential to keep the inlet bore 21 off the bottom of the lobster pound and suspended for example 6" to 8" above the surface. In operation the operator or diver 17 lifts lobsters to the muzzle bore inlet 21 or pulls down on the conduit stretching the resilient elastic stay 62 so that the inlet opening reaches within a few inches of the bottom. Thus, during normal operation the inlet bore hovers over the bottom without touching it and can be moved toward and away at any time by the diver 17.

Figure 3B:
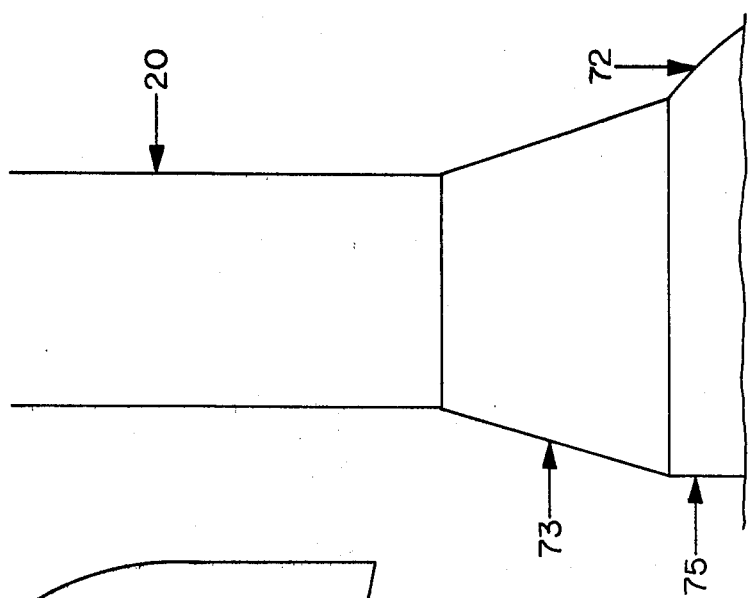
FIG. 3B is a side view of a bottom following inlet skirt for attachment to the open inlet end of the flexible lobster lift passageway enabling automatic operation of the Lobster Lift Machine without diver assistance.
Figure 3A:
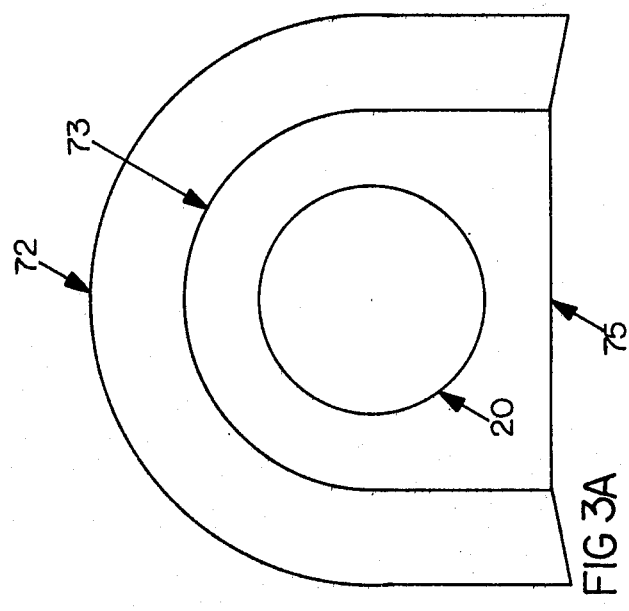
FIG. 3A is a plan view from above.
Figure 3:
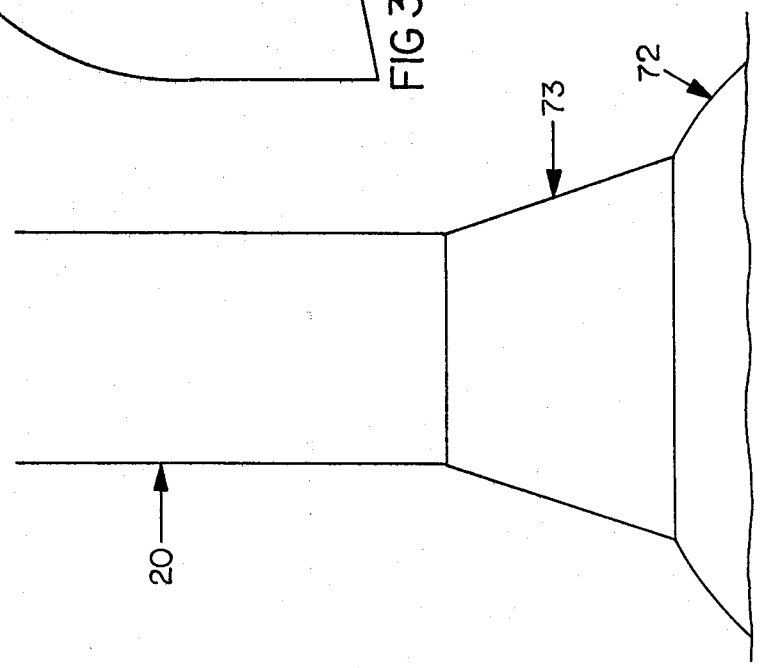
FIG. 3 is a front view.

Referring to FIGS. 3, 3A and 3B there is shown an automatic lobster retrieving head for attachment to the inlet end 21 of the flexible conduit 20. The purpose of this automatic retrieval head is to provide for automatic lobster retrieval by the Lobster Lift Machine without the assistance of diver 17. The automatic lobster retrieval head 70 includes a skirt 72 of semi-flexible semi-rigid material such as heavy plastic and a tapered transition portion 73 in the configuration for example of a truncated cone joining the skirt 72 to the flexible conduit 20. This tapered transition section may be made for example of heavy gage aluminum sheet metal or semi-rigid plastic.

According to this aspect of the invention the automatic lobster retrieval head 70 is placed in contact with the bottom surface of the lobster pound so that the negative pressure draws the head against the bottom surface. The flexibility of skirt 72 permits some resilience in the contact with the bottom surface. The negative pressure continues to draw water through the open mouth 75 formed in the skirt 72 of the retrieval head and water flows upward entraining lobsters or other objects on the bottom in the upward flow of water.

The open mouth 75 at the base of the retrieval head and adjacent the floor of the lobster pound is typically for example 4 inches high and 30 inches wide at the base. The automatic lobster retrieval head is drawn along the bottom surface with the open mouth 75 in the direction of travel. Such movement and drawing of the head along the bottom may be accomplished by means of a guy wire connected to the head in the direction of travel and in turn connected to a boom whose end extends in front of the automatic retrieval head in the direction of travel. The automatic lobster head is thus drawn along the surface tending to hold to the surface due to the negative pressure but drawing in water and lobsters through the open mouth in the direction of travel.

Figure 4:
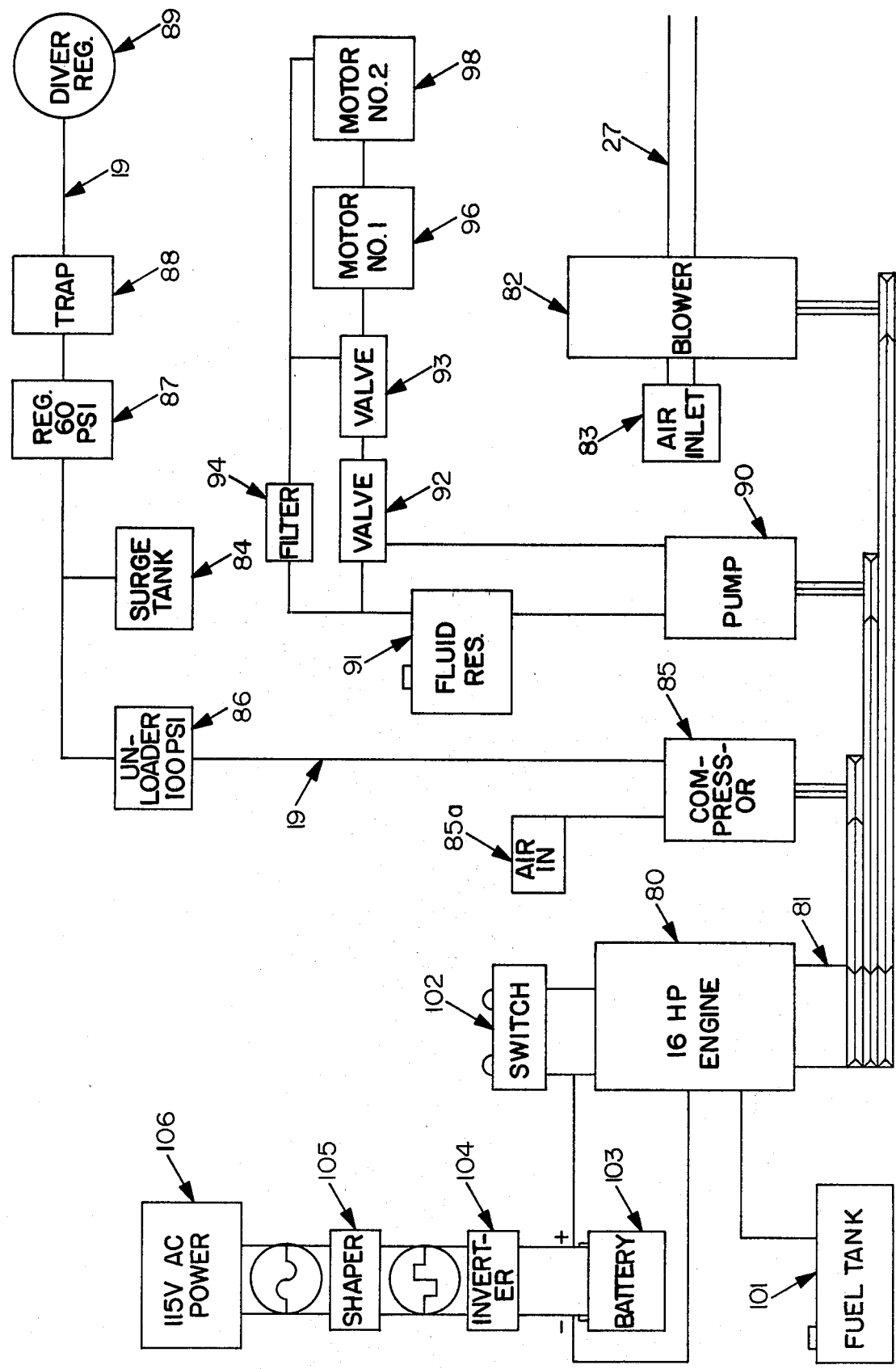
FIG. 4 is a schematic block diagram of the system power sources, controls, and support components for operation of the Lobster Lift Machine and for carrying out the method of retrieving lobsters.

A block diagram of the power supply and supporting components for the Lobster Lift System and Method is shown in FIG. 4. The basic power plant for the operation is a 16 horse power electric start air cooled gasoline engine 80. Engine 80 through centrifugal clutch 81 and V-belts, drives the 350 cubic feet per minute rotary lobe blower 82 which supplies low pressure air, for example 3 to 6 p.s.i. air, through the low pressure air supply hose 27 to the manifold 26 for the lift column 24. The rotary blower also includes an inlet air filter and silencer 83.

Engine 80 also drives the 4 cubic feet per minute oilless air compressor 85 which supplies breathing air for the diver 17. Line 19 which carries the relatively higher pressure air, for example 100 p.s.i. passes through an unloader 86, pressure regulator 87 which regulates the output to approximately 60 p.s.i., and moisture trap 88 to the diver's demand regulator 89. Line 19 also communicates with storage tank 84. The air compressor 85 is provided with an air inlet filter 85a. Thus, the diver's air supply is generally provided in the conventional manner.

The basic power source engine 80 also drives a four gallon per minute hydraulic pump 90 which in turn powers the elevating conveyor 30 through a first hydraulic conveyor motor 96, and powers the packing table conveyor 51 through the second hydraulic conveyor motor 98. This hydraulic system includes a hydraulic reservoir 91, pressure relief valve 92, and motor speed control valve 93. A filter 94 is also provided in the hydraulic oil return line.

The gasoline engine 80 is provided with a fuel tank 101, start stop switch 102, and rechargable storage battery 103.

An auxiliary power supply system is afforded by the battery 103 through 12 volt DC to 115 volt AC inverter 104 wave form regulator 105 to 115 volt AC sign wave output 106. The sign wave output at 106 may be used to operate the electronic scale on the floating deck as hereafter described.

Figure 5:
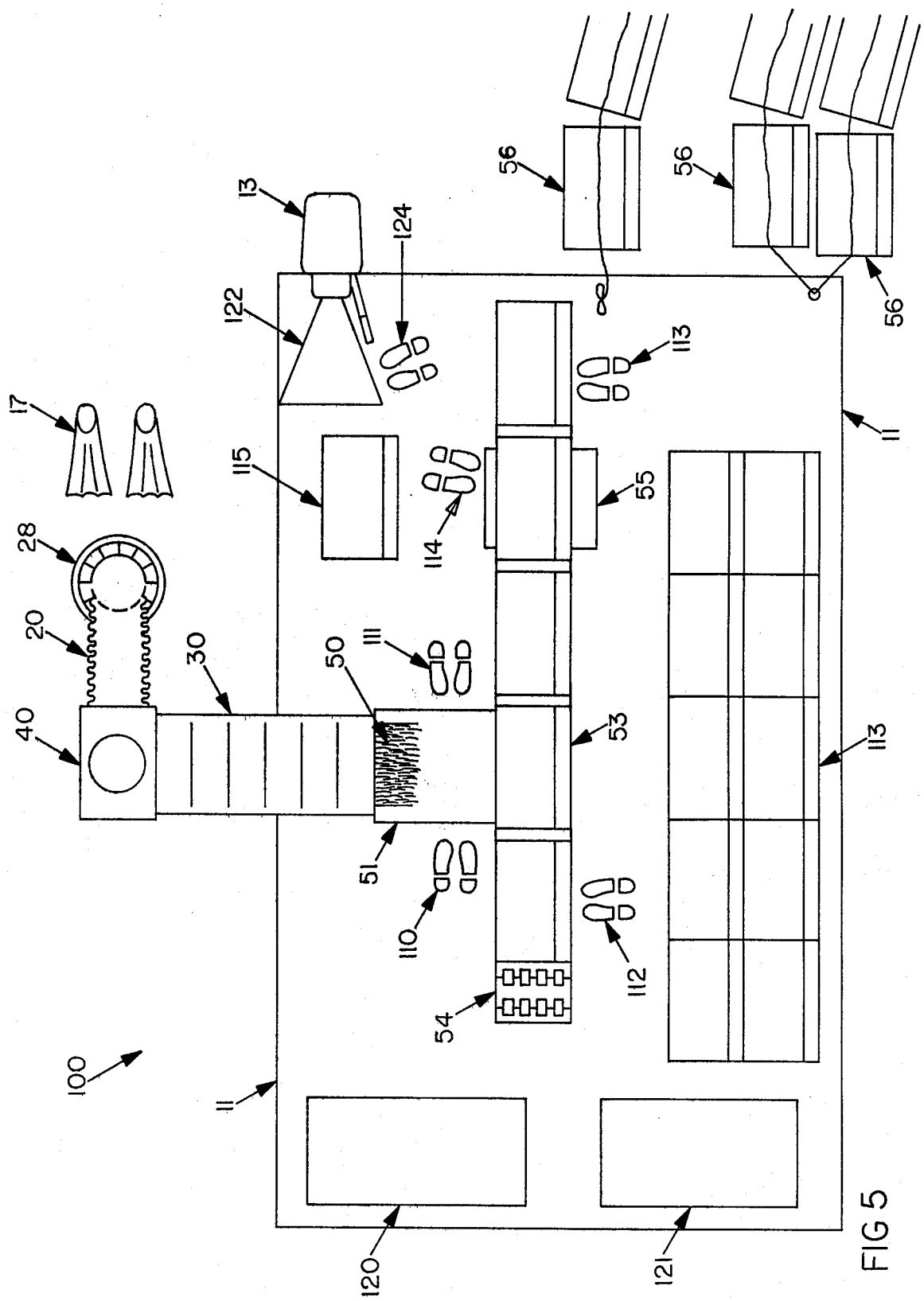
FIG. 5 is a diagrammatic plan view from above of a floating platform, Lobster Lift Machine, and system and method for retrieving and handling lobsters from lobster pounds in accordance with the present invention.

A system and layout for sorting and packing lobsters for the lobster retrieval system is shown diagrammatically in FIG. 5. Elements of the system previously discussed with respect to FIGS. 1 and 2 are similarly numbered. The self-contained floating lobster retrieval and packing system 100 includes the flexible conduit or passageway 20 through which an upward flow of water delivers lobsters through the hopper or transfer enclosure 40 to the lift conveyor 30. The lobsters fall down the shock absorbing shoot 50 to the packing table conveyor 51. Two packers 110 and 111 are generally required at this location for sorting out unwanted materials brought up by the Lobster Lift Machine and for packing the healthy lobsters in a lobster crate 53 positioned at the packing station. A third worker 112 functions as a crate attendant and positions crates from the crate stack 113 onto the roller conveyor 54 for the placement at the packing station as the preceding crate 53 is filled.

The filled crates are moved down the conveyor to the weighing station and scale 55 where a fourth worker 114 weighs the contents of the crate to assure that approximately, for example 100 pounds of lobsters are provided per crate. A make up lobster crate 115 is provided adjacent the weighing attendant 114 to provide a source of lobsters to make up or top off the crate on scale 55 if it is short of 100 pounds. Similarly if the crate is overloaded excess lobsters are placed by the weighing attendant in the make up crate 115. After weighing the full crate is closed and secured by a fifth attendant 116 who strings the full crates onto a line 118 by threading the line through the rope handles on the ends of the crate and securing it to a cleat 119. The full lobster crates after stringing are eased overboard from the roller conveyor 54 to provide strings of lobster crates extending behind the platform 11 of the floating system. The lobsters are thus maintained immersed in the marine environment during the recovery operation.

The power supply and supporting components of the system are mounted on skids 120 and 121 from which various lines and hoses not shown extend. Such couplings are arranged as set forth in the diagram in FIG. 4. These lines include the low pressure air lift line 27 to the air lift column of flexible passageway 20, the higher pressure airline to the diver 17, the hydraulic lines to the conveyor lift loaders, and various electrical wiring.

The floating retrieval system 100 is maneuvered about the lobster pound by an outboard motor 13 located at a corner of the platform 11 and on a bracket 122 which permits wide angle maneuverability of the motor 13. The outboard motor is operated by the driver 124 who follows a pattern over the floor of the lobster pound or negotiates the areas in which the lobsters are particularly plentiful. The driver 124 constitutes the sixth worker or attendant on platform 11. Including the diver 17, a crew of seven is thus shown operating the floating lobster retrieval system according to the present invention.

In carrying out this method of lobster retrieval and packing the empty crates in the stack 113 have been pre-weighed and marked to indicate the empty weight of the crate. The weighing attendant at 116 sets the zero level of the scale at the empty weight of the crate as marked in the crate when it arrives at the weighing station. The weighing attendant at 114 therefore actually determines the difference between the total weight of the crate and lobsters less the empty weight of the crate. This difference is adjusted by addition or removal of lobsters using the make up crate 115 to provide the desired weight of lobsters, typically 100 pounds for the standard size crate.

Figure 6:
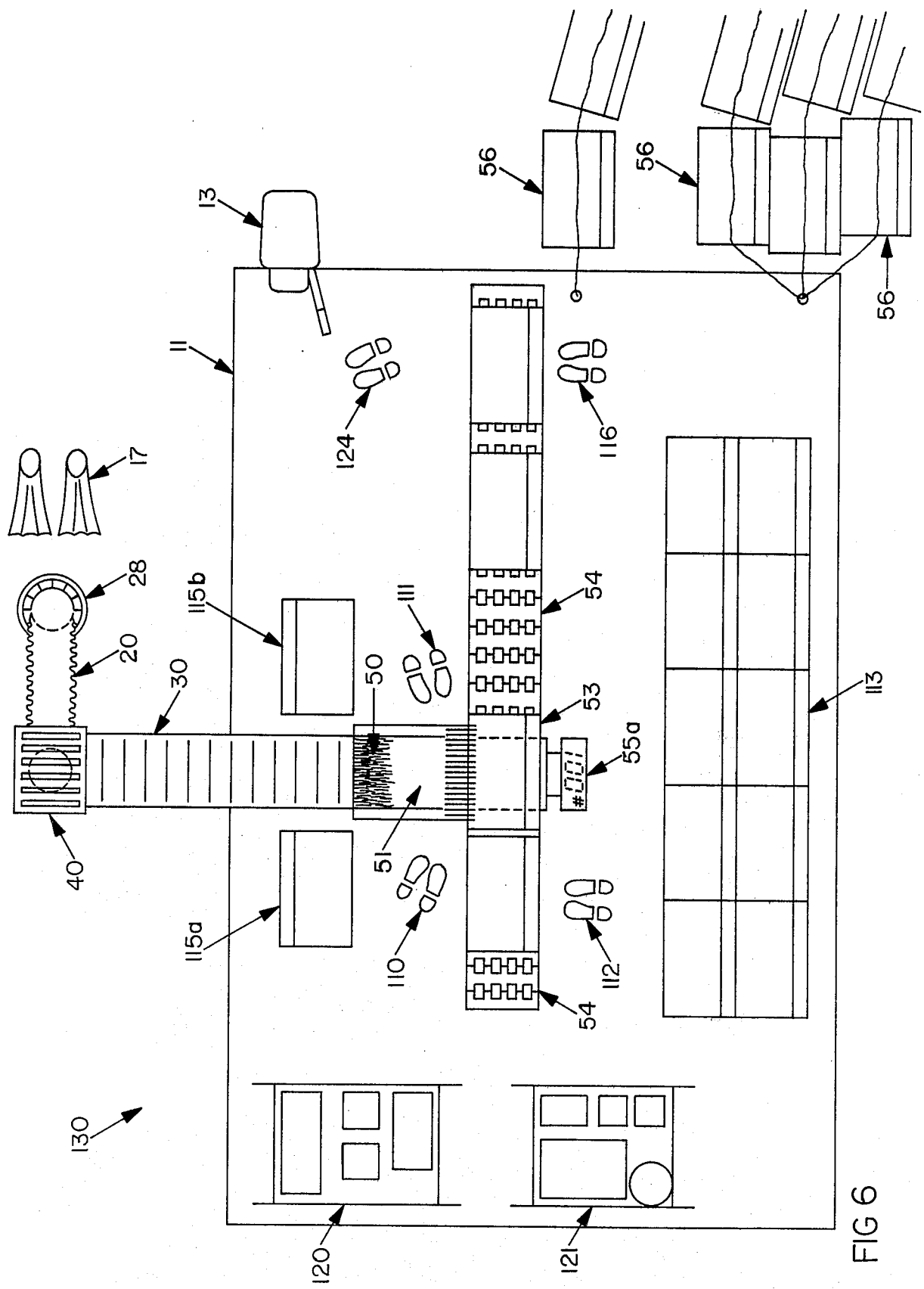
FIG. 6 is a diagrammatic plan view from above of a floating platform, Lobster Lift Machine, and modified system and method for retrieving and handling lobsters from lobster pounds.

A reduction in the number of personnel necessary to operate such a system is achieved by the modified floating lobster retrieval and packing system 130 illustrated in FIG. 6. Similar elements in common with those of FIG. 5 are similarly numbered. One member of the crew has been eliminated by the system in FIG. 6. This is accomplished by substituting the digital scale 55A for the conventional mechanical scale 55. The digital scale 55A with micro processor capability is positioned directly at the packing station and is programmed and adjusted to provide a zero read out after the empty crate 53 has settled on the scale.positioned by the crate attendant 112. In this modified arrangement the packers 110 and 111 with the assistance of the digital electronic scale 55A also perform the weighing function. Therefore each packing attendant is provided with a make up crate 115A and 115B in which excess lobsters may be placed or from which additional lobsters may be taken to make up the full complement of a load in crate 53. This is determined by the digital readout of the scale 55A. By this arrangement the additional weighing attendant 114 has been eliminated from the packing line. The crates 53 are moved along the roller conveyor 54 directly to the attendant 116 who closes and secures the crates for stringing out behind the platform 11. When all the crates are filled, the floating system returns to the dock for loading the full crates.

By means of the foregoing lobster retrieval and packing system lobsters can be retrieved from the pound faster than with dragging and with a smaller crew, enabling larger lots to be sold at a time and at reduced costs. Physical damage to the lobsters is effectively eliminated and the lobsters are protected from colder weather by being out of the water for only a short interval. Furthermore, the recovery method can be performed in difficult bottom terrain or where an aeration system has been installed and actual contact with the bottom can be avoided. The method is effective even when the density of lobsters is low and without the necessity of draining the lobster pound. The invention is particularly adapted for use in lobster pounds and similar shallow bodies of water with a depth, for example, in the range of approximately 6 to 30 feet of water.

While the invention has been described with reference to particular example embodiments it will be appreciated that it is intended to cover variations and equivalents within the scope of the appended claims.

We claim:

1. Apparatus for lifting lobsters and similar objects from the bottom or floor of a lobster pound or other water body to the surface of the water and for handling the objects above the water surface for delivery above said surface comprising:

flexible passageway means having a length at least sufficient to extend from the bottom to the water surface and having a diameter sufficient to accommodate objects to be lifted, said passageway means having an open inlet end for movement adjacent the bottom and an open outlet end for positioning adjacent the water surface;

conveying means for receiving objects adjacent the water surface and delivering said objects above the surface of the water;

means for establishing a flow of water upward from the bottom to the water surface in the flexible passageway means whereby objects are entrained in the water flow and lifted to the surface; and coupling guide means operatively arranged for coupling the outlet end of the flexible passageway means to the conveying means and for guiding and directing objects lifted to the surface onto said conveying means, said coupling guide means comprising chamber means having an angled cover surface, said angled cover surface operatively arranged and angled for directing objects lifted to the water surface onto the conveying means, said angled cover surface formed with openings for passing water away from the conveying means.

2. The apparatus of claim 1 wherein said means for establishing a flow of water in the flexible pasageway means comprises means for releasing air at low pressure into the flexible pasageway means below the surface of the water.

3. The apparatus of claim 2 wherein said means for releasing air comprises an annular air jet manifold for injecting jets of air from all sides of the passageway means.

4. The apparatus of claim 1 further comprising means for receiving objects from the conveying means in an energy dissipating shock absorbing manner.

5. The apparatus of claim 1 wherein is provided boom means for supporting said flexible passageway means to form a substantially horizontal S-shaped curvature below the water surface, said S-shaped curvature having a convex upward portion and a convex downward portion, said flexible passageway means also formed with a substantially straight vertical lift column portion extending to the water surface from the convex downward portion.

6. The apparatus of claim 5 wherein said means for supporting the flexible passageway means comprises pivotable boom means supporting the passageway means at the convex upward portion for movement of the inlet end of the passageway means to different areas of the bottom.

7. The apparatus of claim 6 wherein the means for establishing a flow of water upward comprises means for releasing air at low pressure into the flexible passageway means below the water surface at the lower end of the vertical lift column portion.

8. The apparatus of claim 7 further comprising handle means mounted at the inlet end of the passageway means for grasping and moving the inlet end over an area of the bottom.

9. The apparatus of claim 1 further comprising a floating platform and pivotable boom means mounted for supporting the flexible passageway means at a location along its length, said conveying means, coupling guide means, and boom means being rigidly mounted to the floating platform.

10. The apparatus of claim 9 wherein the boom means mounted for supporting the flexible passageway means at a location along its length introduces a substantially horizontal S-shaped curvature into the passageway means having convex upward and downward portions and wherein the end of said boom is supported by an elastic stay or guy.

11. The apparatus of claim 1 wherein said coupling guide means further comprises flap means positioned below the conveying means to prevent objects from falling below the conveying means rather than onto the conveying means.

12. The apparatus of claim 1 wherein said conveying means extends below the surface of the water.

13. Apparatus for lifting lobsters from the bottom or floor of a lobster pound or other relatively shallow water body to the surface of the water and for handling the lobsters above the water surface for delivery above said surface comprising:

passageway means extending from the bottom to the water surface and having a diameter sufficient to accommodate lobsters to be lifted without injury, said passageway means comprising a flexible conduit portion having a movable open inlet end and having sufficient length for selectively moving the open inlet end adjacent to but spaced from the bottom, said passageway means also comprising a substantially straight vertical lift column portion having an open outlet end for positioning adjacent to the water surface;

boom means for supporting the flexible conduit portion of said passageway means so that said flexible conduit portion includes a substantially horizontal S-shaped curve to facilitate movement of the inlet end, said substantially straight vertical lift column portion comprising a substantially rigid column coupled to the curved portion for extending to the water surface from the curved portion;

means for establishing a flow of water upward from the bottom to the water surface in the passageway means whereby lobsters may be entrained in the water flow and lifted to the surface comprising air ejector means for releasing low pressure air at the base of the substantially straight vertical lift column portion of the passageway means for continuously displacing water in said vertical section so that a relatively large volume flow of water at low pressure rises upward through the passageway means for conveying lobsters gently through the passageway means;

conveying means for receiving lobsters adjacent to the water surface and delivering said lobsters above the water suface, said conveying means constructed and arranged for shedding water away from said objects;

transfer coupling means operatively arranged for receiving the upward flow of water from the outlet end of the passageway means and for guiding and directing lobsters lifted to the surface onto said conveying means, said transfer coupling means comprising at least a partial enclosure formed with openings for shedding water away from the lobsters as they are transferred to the conveying means;

and flexible joint means coupling the outlet end of the substantially vertical lift column portion to said transfer coupling means so that said lift column portion may bend at the flexible joint means if it strikes an obstruction.

14. Apparatus of claim 13 wherein said apparatus is mounted on a floating platform and further comprising means for propelling and maneuvering said floating platform around the lobster pound or other relatively shallow water body.

15. Apparatus for lifting lobsters and similar objects from the bottom or floor of a lobster pound or other water body to the surface of the water and for handling the objects above the water surface for delivery above said surface comprising:

flexible passageway means having a length at least sufficient to extend from the bottom to the water surface and having a diameter sufficient to accommodate objects to be lifted, said passageway means having an open inlet end for movement adjacent the bottom and an open outlet end for positioning adjacent the water surface;

conveying means for receiving objects adjacent the water surface and delivering said objects above the surface of the water;

means for establishing a flow of water upward from the bottom to the water surface in the flexible passageway means with sufficient momentum so that the water flow gushes or rises slightly above the water surface whereby objects are entrained in the water flow and lifted slightly above the water surface; and coupling guide means operatively arranged for coupling the outlet end of the flexible passageway means to the conveying means, said coupling guide means comprising an angled surface arranged for diverting objects lifted above the water surface onto the conveying means, said angled surface formed with openings for diverting and passing water away from the conveying means.

* * * * *